United States Patent
Swoboda

(10) Patent No.: US 8,473,920 B2
(45) Date of Patent: Jun. 25, 2013

(54) APPLICATION INITIATED TRACING OF ITS OPERATION BEGINNING WITH RESET

(75) Inventor: Gary L. Swoboda, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/038,795

(22) Filed: Mar. 2, 2011

(65) Prior Publication Data

US 2013/0091389 A1    Apr. 11, 2013

Related U.S. Application Data

(60) Provisional application No. 61/309,645, filed on Mar. 2, 2010.

(51) Int. Cl.
*G06F 9/44* (2006.01)
(52) U.S. Cl.
USPC .......................... 717/128; 717/124; 717/136
(58) Field of Classification Search
None
See application file for complete search history.

(56) References Cited

U.S. PATENT DOCUMENTS 6,513,134 B1 * 1/2003 Augsburg et al. .......... 714/38.13
6,728,949 B1 * 4/2004 Bryant et al. ................. 717/127

* cited by examiner

*Primary Examiner* — Chuck Kendall
(74) *Attorney, Agent, or Firm* — Robert D. Marshall, Jr.; Wade James Brady, III; Frederick J. Telecky, Jr.

(57) ABSTRACT

This invention includes a state machine entering a first state upon cold reset of the data processing system. Trace information collection and trace information export are prohibited in the first state. The state machine transits from said first state to a second state upon a change in a predetermined bit to a first state. Direct memory access setup is enabled in the second state. The state machine transits from the second state to a third state upon set up of the direct memory access. Trace information collection is enabled in the third state. The state machine transits from the third state to a fourth state upon a direct memory access request corresponding to the direct memory access setup in the second state. Trace data export via direct memory access from the trace collection unit is enabled in the fourth state.

9 Claims, 1 Drawing Sheet

APPLICATION INITIATED TRACING OF ITS OPERATION BEGINNING WITH RESET

CLAIM OF PRIORITY

This application claims priority under 35 U.S.C. 119(e)(1) to U.S. Provisional Application No. 61/309,645 filed Mar. 2, 2010.

TECHNICAL FIELD OF THE INVENTION

The technical field of this invention is trace upon system reset.

BACKGROUND OF THE INVENTION

Trace of program and system activity currently uses high speed application interfaces available as part of the functional capability of a System On Chip (SOC). It desirable that these interfaces provide trace capability from release of a warm reset.

SUMMARY OF THE INVENTION

This invention disables high speed interfaces for trace upon a cold reset. After release of the cold reset, application code enables trace using a register that is cleared only by a cold reset. The register value is not changed by warm reset. Once trace is enabled the application code initiates a warm reset. The high speed application interface then begins to move trace data through the high speed interface as it is generated.

This invention permits operation of an application to be observed from the release of warm reset without an emulator or test equipment connected to the application.

This invention includes a state machine entering a first state upon cold reset of the data processing system. Trace information collection and trace information export are prohibited in the first state. The state machine transits from said first state to a second state upon a change in a predetermined bit to a first state. Direct memory access setup is enabled in the second state. The state machine transits from the second state to a third state upon set up of the direct memory access. Trace information collection is enabled in the third state. The state machine transits from the third state to a fourth state upon a direct memory access request corresponding to the direct memory access setup in the second state. Trace data export via direct memory access from the trace collection unit is enabled in the fourth state.

The state machine additionally initiates a warm reset of the central processing unit upon entry into the second state.

The change in the predetermined bit state occurs via a memory mapped write to a predetermined register.

The state machine additionally enables trace information collection in the fourth state.

The state machine transits from the fourth state to the first state upon a change in a predetermined bit to an opposite second state.

BRIEF DESCRIPTION OF THE DRAWINGS

These and other aspects of this invention are illustrated in the drawings, in which.

DETAILED DESCRIPTION OF PREFERRED EMBODIMENTS

In a system where debug is desired, it is often desirable to collect information about system operation with hardware monitors of central processing units (CPUs), direct memory access (DMA) units and other units. The information generated by these units may be merged into a single stream of instrumentation data and exported using as trace data using a functional interface such as USB3, Gigabit Ethernet, Rapid IO, Aurora, or others. This invention activates the trace function with the execution of application code with the tracing system activity including system activity following a system reset.

Figure 1:
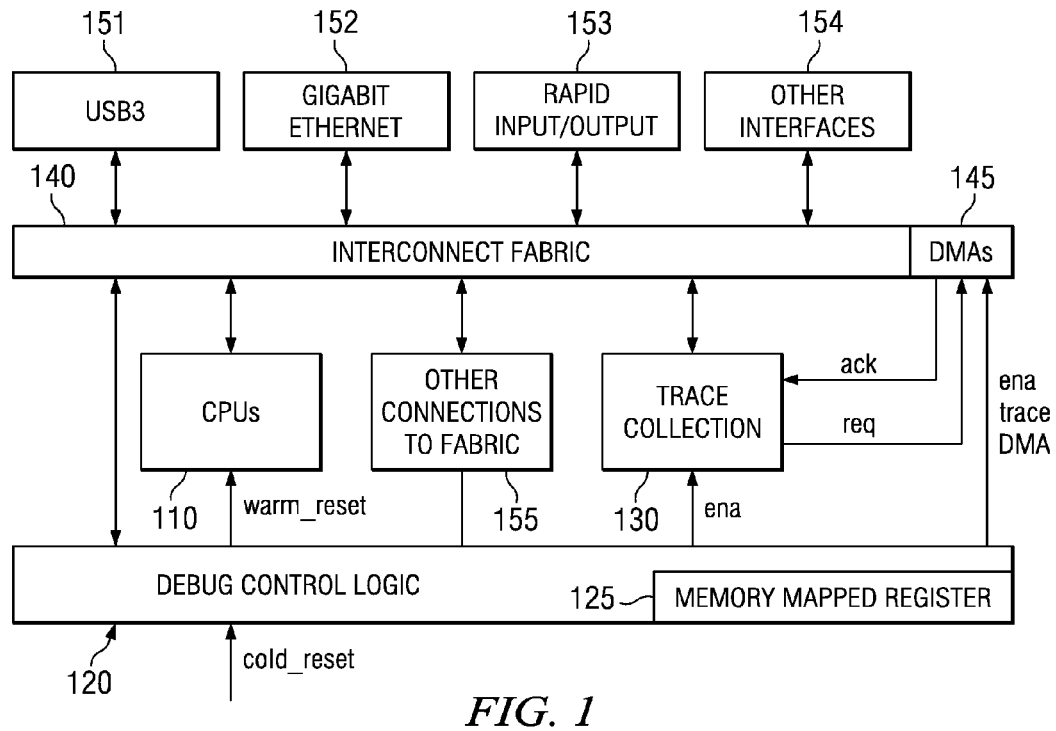
FIG. 1 is a block diagram of an example System On Chip (SOC) to which this invention is applicable.

FIG. 1 illustrates typical SOC 100 using this invention. As indicated by its name SOC 100 is fabricated upon a single integrated circuit (chip). SOC 100 includes one or more central processing units (CPUs) 110 providing program controlled data processing operations. CPUs 110 are connected to various input/output (I/O) peripherals via an interconnection fabric 140. The example of FIG. 1 illustrates these I/O peripherals include Universal Serial Port 3 (USB3) 151, Gigabit Ethernet 152, Rapid I/O 153 and other interfaces 154. Interconnect fabric 140 includes at least one direct memory access (DMA) unit 145. SOC 100 includes other connections 155 to Interconnect Fabric 140. Trace collection unit 130 collects trace information from one or more areas of SOC 100 in a manner known in the art, places this trace information in an internal buffer or FIFO and may output trace information via Interconnect Fabric 140 and one of the I/O peripherals. This process is aided by connection to DMAs 145. Trace collection unit 130 is controlled via an enable signal by debug control logic 120. Debug control logic 120 receives a cold reset signal and supplies a warm reset signal CPUs 110. Debug control logic 120 includes memory mapped register 125 used in a manner described below. FIG. 1 does not illustrate all memory read/write connections for clarity.

In this invention a cold reset of SOC 100 establishes an operating mode where the application manages the export of trace data, without the aid of an external Debug and Test Controller (DTC). Following this cold reset:

Trace collection may or may not be enabled;

Transfer of trace information from the collection to an exporting interface is disabled; and The application code may enable the collection of trace data and the export of trace data via a high speed interface.

Subsequent to or concurrent with enabling trace data collection, the application code initiates a CPU warm reset. The reset does not affect the register values controlling the collection of trace and the export of trace data via the high speed interface. These register values may be stored in memory mapped register 125. This enables collection and export of trace data from the release of warm reset. A subsequent cold reset reestablishes the state described above. A memory mapped register 125 bit write both initiates the collection of trace data and sets up a DMA transfer of trace data from trace collection unit 130 to the high speed interface.

Figure 2:
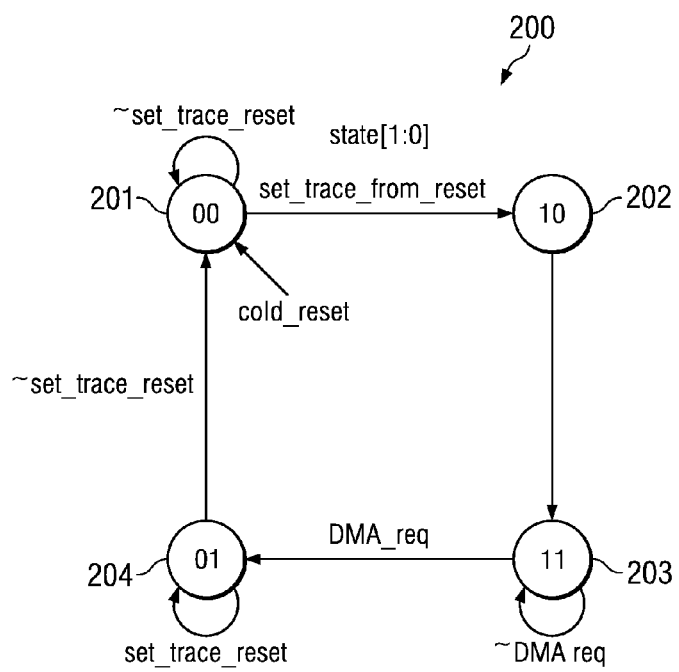
FIG. 2 is a state diagram of operation of one embodiment of this invention.

FIG. 2 illustrates the states of a state machine implementing this invention. The preferred embodiment includes state machine 200 within debug control logic 130. A cold reset initializes state machine 200 to state "00" 201. A subsequent write to a predetermined register bit trace_from_reset (set_trace_from_reset) in memory mapped register 125 causes a transition to state "10" 201. This is the memory mapped register bit noted above. If this write does not occur (~set_trace_reset), state machine 200 remains in state "00" 201.

State machine 200 enters state "10" 202 following set_trace_from_reset. State "10" 202 causes a warm reset of CPUs 110 and initiates setup of a DMA transfer from Trace Collection unit 130. This set up is later used for trace information movement.

State machine 200 automatically moves from state "10" 202 to state "11" 203 following the DMA transfer setup. State machine 200 waits in state "11" 203 until the DMA requests data from Trace Collection unit 130. Trace Collection unit 130 may not have any data yet available. State machine 200 transitions to state "01" 203 when DMA request (DMA_req) occurs. If this DMA request does not occur (~DMA_req), state machine 200 remains in state "11" 203. Trace collection is enabled in state "01" 201 and in state "11" 203 via the ena signal (FIG. 1).

State machine 200 enables output of trace data according to the previously set up DMA request. FIG. 1 illustrates trace collection unit 130 communicating with DMA unit 145 via request (req) and acknowledge (ack) lines. Trace information is them output from trace collection unit 130 via interconnect fabric 140 and one or more of the I/O peripherals 151, 152, 153 and 154.

State machine 200 remains in state "01" as long as the trace_from_reset register bit in memory mapped register 125 is a logic 1 (set_trace_reset). State machine 200 transitions to initial state "00" 201 when the trace_from_reset register bit is no longer logic 1 (~set_trace_reset). This bit change is accomplished via a memory mapped write to register 125 the same as the previous transition of this register bit.

This function may be implemented many other ways. The architecture shown in FIG. 1 is abstract and represents the numerous ways of implementing a typical SOC architecture.

What is claimed is:

1. A method controlling trace collection and export in a data processing system comprising the steps of:
    entering a first state upon cold reset of the data processing system;
    prohibiting trace information collection and trace information export in said first state;
    transiting from said first state to a second state upon a change in a predetermined bit to a first state;
    enabling a direct memory access setup in said second state;
    transiting from said second state to a third state upon setup of said direct memory access;
    enabling trace information collection in said third state;
    transiting from said third state to a fourth state upon a direct memory access request corresponding to said direct memory access setup in said second state; and
    enabling trace data export via a direct memory access corresponding said direct memory access request from a trace collection unit.

2. The method of claim 1, further comprising the step of:
    initiating a warm reset of a central processing unit upon entry into said second state.

3. The method of claim 1, wherein:
    said change in said predetermined bit state occurs upon a memory mapped write to a predetermined bit in a predetermined register.

4. The method of claim 1, further comprising the step of:
    enabling trace information collection in said fourth state.

5. The method of claim 1, further comprising the step of:
    transiting from said fourth state to said first state upon a change in a predetermined bit to a second state opposite to said first state.

6. A data processing apparatus fabricated on a single integrated circuit comprising:
    at least one central processing unit operable to perform data processing operations under program control;
    a trace collection unit connected to said at least one central processing unit operable to collect trace information corresponding to data processing operations of said at least one central processing unit;
    at least one data output peripheral operable to output data from the single integrated circuit to external circuits;
    a direct memory access unit connected to said trace collection unit and said at least one data output peripheral operable transfer trace information from said trace collection unit to said at least one data output peripheral in response to a corresponding direct memory access request; and
    a debug control logic connected to said central processing unit, said trace collection unit and said direct memory access unit, said debug control logic including a memory mapped register having a predetermined bit, said debug control logic operable to
        enter a first state upon cold reset of the data processing system,
        prohibit trace information collection and trace information export in said first state,
        transition from said first state to a second state upon a change in said predetermined bit to a first state,
        enable a direct memory access setup by said at least one central processing unit in said second state,
        transition from said second state to a third state upon elapse of a predetermined period of time,
        enable trace information collection by said trace collection unit in said third state,
        transition from said third state to a fourth state upon receipt of a direct memory access request corresponding to said direct memory access setup in said second state, and
        enable trace data export via a direct memory access corresponding said direct memory access request from said trace collection unit to said at least one data output peripheral.

7. The data processing apparatus of claim 6, wherein:
    said debug control logic is further operable to initiate a warm reset of a central processing unit upon entry into said second state.

8. The data processing apparatus of claim 6, wherein:
    said debug control logic is further operable to enable trace information collection by said trace collection unit in said fourth state.

9. The data processing apparatus of claim 6, wherein:
    said debug control logic is further operable to transition from said fourth state to said first state upon a change in a predetermined bit to a second state opposite to said first state.

* * * * *